(12) United States Patent
Cox (10) Patent No.: US 9,264,423 B2
(45) Date of Patent: Feb. 16, 2016

(54) PASSWORD-LESS AUTHENTICATION SYSTEM AND METHOD

(71) Applicant: nadaPASS, Inc., Taylor, MI (US)

(72) Inventor: Jay Lawrence Cox, Brownstown, MI (US)

(73) Assignee: NADAPASS, INC., Taylor, MI (US)

(*) Notice: Subject to any disclaimer, the term of this patent is extended or adjusted under 35 U.S.C. 154(b) by 0 days.

(21) Appl. No.: 14/302,591

(22) Filed: Jun. 12, 2014

(65) Prior Publication Data

US 2015/0365400 A1 Dec. 17, 2015

(51) Int. Cl.
G06F 21/31 (2013.01)
H04L 29/06 (2006.01)

(52) U.S. Cl.
CPC .......... *H04L 63/0823* (2013.01); *H04L 63/164* (2013.01)

(58) Field of Classification Search
CPC ....................................................... G06F 21/31
USPC ............................................................. 726/7
See application file for complete search history.

(56) References Cited

U.S. PATENT DOCUMENTS 8,365,267 B2 * 1/2013 Wang et al. .................. 726/8
2009/0328169 A1 * 12/2009 Hutchison et al. ............ 726/7

FOREIGN PATENT DOCUMENTS

EP 2611096 * 3/2013 .............. H04L 29/06

* cited by examiner

*Primary Examiner* — Kambiz Zand
*Assistant Examiner* — Thanh Le
(74) *Attorney, Agent, or Firm* — Leveque Intellectual Property Law, P.C.

(57) ABSTRACT

In one aspect, the present disclosure describes a server-implemented method for authenticating a login without a password. The method includes: a) receiving, from a request initiator, a request to authenticate a login, the request including a user identifier; b) providing, to a device pre-registered for use in association with the user identifier, an acknowledgement request, the device being configured to generate a prompt in response to receiving the acknowledgment request, the prompt requesting input to authenticate the login; c) initiating a timer; d) determining that a login confirmation message has been received from the pre-registered device before expiration of the timer; and e) in response to determining that the login confirmation message has been received from the pre-registered device before expiration of the timer, providing an authentication acknowledgment message to the request initiator.

20 Claims, 7 Drawing Sheets

PASSWORD-LESS AUTHENTICATION SYSTEM AND METHOD

TECHNICAL FIELD

The present disclosure relates to authentication of a user and, more particularly, methods, systems and devices for authenticating a user without the use of a password.

BACKGROUND

Traditionally, username and password combinations have been used to authenticate a user logging into a secure system such as a website. This technique is fraught with problems. For example, this authentication technique relies on a user having to remember their password. Sometimes systems place certain constraints on passwords in an effort to make the system more secure (e.g. requiring a certain number of characters, certain types of characters, etc.) and, while such constraints may be helpful to make the system more secure, they may also make the created password more difficult for a user to remember.

Additionally, password-based authentication is also susceptible to attack. For example, keylogging software may be installed on a device by a hacker or fraudster and may be used to secretly monitor keystrokes, including passwords. Since passwords are often sent from one computer to another (e.g. from the computer that a user is typing the password on to a computer which receives the password to authenticate the user), passwords are also susceptible to a sniffing attack (e.g., capture and analysis of packets of data flowing over a network). For example, packet sniffing software may be used by a fraudster connected to a user's Wi-Fi network to capture passwords sent by the user over the network.

Passwords are also susceptible to an attack directed at the secure system itself. For example, a brute force attack consists of an automated hacker program constantly attempting logins using a single user-name and millions of password combinations. There are numerous examples in recent history where a hacker has gained access to a secure system through vulnerabilities such as newly discovered weaknesses in security applications (such as openSSL), causing the secure system to request that users change their passwords.

Accordingly, there is a need for improved methods of authenticating a login of a user.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present disclosure describes a server-implemented method for authenticating a login without a password. The method includes: a) receiving, from a request initiator, a request to authenticate a login, the request including a user identifier; b) providing, to a device pre-registered for use in association with the user identifier, an acknowledgement request, the device being configured to generate a prompt in response to receiving the acknowledgment request, the prompt requesting input to authenticate the login; c) initiating a timer; d) determining that a login confirmation message has been received from the pre-registered device before expiration of the timer; and e) in response to determining that the login confirmation message has been received from the pre-registered device before expiration of the timer, providing an authentication acknowledgment message to the request initiator.

In another aspect, the present disclosure describes a login authority server. The login authority server includes one or more communication subsystems for communicating with other devices and a processor coupled to the communication subsystem. The login authority server also includes at least one memory coupled to the processor. The memory stores user profiles for a plurality of users. At least one user profile associates a user identifier with an electronic device pre-registered for use with the user associated with the user identifier. The memory stores processor-executable instructions which, when executed by the processor, cause the processor to: a) receive, from a request initiator, a request to authenticate a login, the request including on of the user identifiers; b) provide, to the electronic device pre-registered for use in association with the user identifier, an acknowledgement request; c) initiate a timer; d) determine that a login confirmation message has been received from the pre-registered electronic device before expiration of the timer; and e) in response to determining that the login confirmation message has been received from the pre-registered electronic device before expiration of the timer, provide an authentication acknowledgment message to the request initiator.

In another aspect a non-transitory computer readable medium is described. The computer readable medium includes computer-executable instructions that, when executed, configure a processor for a) receiving, from a request initiator, a request to authenticate a login, the request including a user identifier; b) providing, to a device pre-registered for use in association with the user identifier, an acknowledgement request, the device being configured to generate a prompt in response to receiving the acknowledgment request, the prompt requesting input to authenticate the login; c) initiating a timer; d) determining that a login confirmation message has been received from the pre-registered device before expiration of the timer; and e) in response to determining that the login confirmation message has been received from the pre-registered device before expiration of the timer, providing an authentication acknowledgment message to the request initiator.

In another aspect, a method for facilitating a login without a password is described. The method is performed by a processor of a device pre-registered with a login authority server. The login authority server is configured for receiving, from a request initiator, a request to authenticate the login. The method includes: a) receiving an authentication request from the login authority server; b) in response to receiving the authentication request, generating a prompt requesting user input confirming a desire to proceed with a login; c) after generating the prompt, receiving input from an input mechanism associated with the device; d) responding to the authentication request by sending a response to the login authority server based on the received input.

In another aspect, a user device is described. The user device includes one or more communication subsystems for communicating with a login authority server and a processor coupled to the communication subsystem. The user device also includes at least one memory coupled to the processor. The memory stores processor-executable instructions which, when executed by the processor, cause the processor to: a) receive an authentication request from the login authority server; b) in response to receiving the authentication request, generate a prompt requesting user input confirming a desire to proceed with a login; c) after generating the prompt, receive input from an input mechanism associated with the device; d) respond to the authentication request by sending a response to the login authority server based on the received input.

In another aspect a non-transitory computer readable medium is described. The computer readable medium includes computer-executable instructions that, when executed, configure a processor for a) receiving an authentication request from the login authority server; b) in response to receiving the authentication request, generating a prompt requesting user input confirming a desire to proceed with a login; c) after generating the prompt, receiving input from an input mechanism associated with the device; d) responding to the authentication request by sending a response to the login authority server based on the received input.

Other example embodiments of the present disclosure will be apparent to those of ordinary skill in the art from a review of the following detailed description in conjunction with the drawings.

Example System for Authenticating a User without a Password

Figure 1:
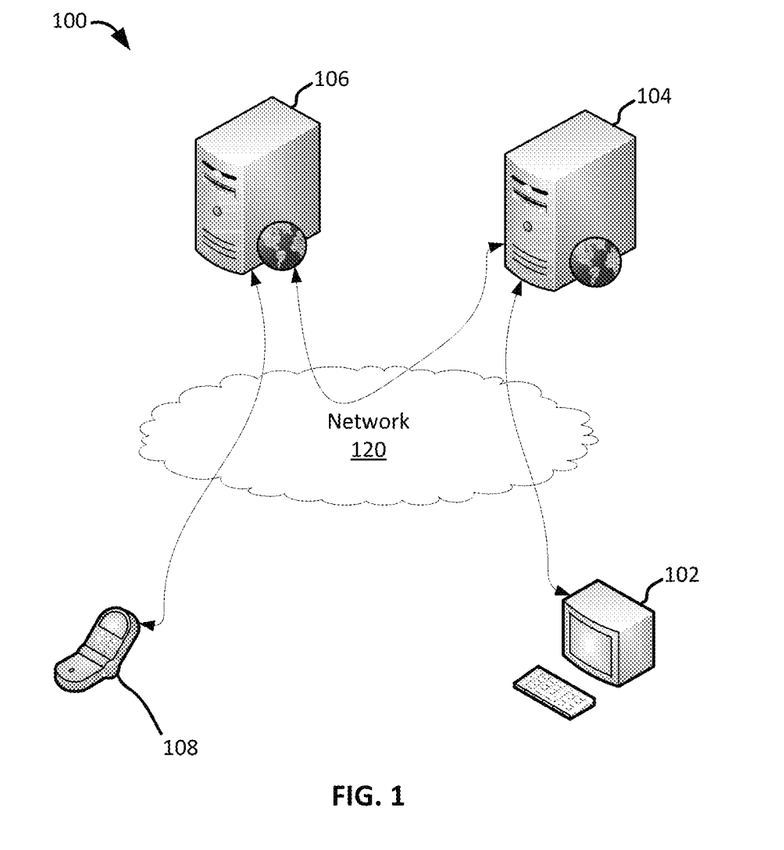
FIG. 1 is a block diagram of a system for authenticating a user without a password in accordance with an example embodiment of the present disclosure.

Referring now to FIG. 1, an example system for authenticating a user without a password is illustrated. The example system includes a number of servers and devices which connect to one another via one or more networks 120. These devices and servers function to allow a third party server or system, which may be referred to as a request initiator 104, to allow a user operating a client device 102 to login or be otherwise authenticated by the request initiator 104 without the use of a password.

More specifically, when a user wishes to login or be otherwise authenticated by the request initiator 104, the user provides a unique user identifier to the request initiator 104. For example, the user may input their user identifier using a client device 102 which is connected to the request initiator 104 through the network 120. The request initiator 104 may then send a request to externally authenticate a login (or a request to otherwise authenticate a user) to a login authority server 106. The request to authenticate the login includes the user identifier, allowing the login authority server 106 to perform actions based on the specific user identifier. More specifically, the login authority server 106 uses the user identifier to identify one or more electronic devices which are pre-registered (i.e., registered prior to the receipt of the request to authenticate the login) for use in association with the user identifier. Such devices are referred to as user devices 108 at various portions of this document. The request to authenticate the login that is sent to the login authority server 106 may include other information in addition to the user identifier. For example, in some embodiments, a requestor identifier is included which identifies the request initiator making the request. In some instances, a browser instance identifier may be included in the request. The browser instance identifier may be a randomly generated code that may be generated by the request initiator (or by the login authority server 106 and communicated to the request initiator). The browser instance identifier may, for example, be displayed on a display screen that is displayed on the client device 102. In some embodiments, the browser instance identifier may be used to provide an additional layer of security when a possible attack on the login authority server 106 is detected.

Having identified a user device 108 pre-registered for use in association with a user identifier, the login authority server 106 provides an acknowledgement request to that device. The acknowledgment request may be pushed or pulled to the user device 108. The user device 108 is configured to generate a prompt in response to receiving the acknowledgement request to request input from the user to authenticate the login. In some instances, the user device 108 that is identified may be the client device 102 which interacted with the request initiator 104.

The user may then use an input mechanism associated with the user device 108 to either confirm a desire to proceed with the login or to deny that login. In situations wherein multiple, concurrent (or near concurrent) logins are detected for the same user and the same server or site (e.g., indicating potential hacker attacks), additional security precautions can be employed, such as the required input of the browser instance ID by the user at the user device 108. If the user confirms their desire to proceed with a login, the user device 108 sends a login confirmation message to the login authority server 106. This login authority message authorizes the login authority server to inform the request initiator 104 that the login (or other authentication) has been authorized. In response, the request initiator 104 logs in the user based on the user identifier, or otherwise enables the user to use a private service, website, or feature provided by the request initiator 104.

One or more prior authentication methods used by the request initiator 104 before implementing the authentication system described in this document may be used in addition to or, in conjunction with, this authentication system.

If the user indicates that they do not want to proceed with the login (i.e. that they wish to deny the login), then a decline login message is sent to the login authority server 106. This message informs the login authority that the login is not authorized and the login authority server then sends message to the request initiator 104 to inform the request initiator that the login has been declined by the user associated with the specified user identifier.

In at least some embodiments, the sending of the message by the login authority server 106 to the request initiator 104 may be done by updating the original request at the login authority server and flagging that request as denied. The updated request can then be pushed or pulled to the request initiator 104.

This process and architecture allows a login to be performed without having to transmit a password over the network 120. Furthermore, the use of a centralized login authority server 106 (i.e. which may be accessed by many different request initiators), also allows a uniform user identifier to be used across many servers. The system design described herein also makes the entire authentication process far more secure.

In at least some embodiments, one or more timer is used so that a user only has a certain amount of time to complete the login process. For example, in some embodiments, a timer is initiated at the login authority server 106 after the request to authenticate a login is received from the request initiator and the acknowledgment request is provided to the user device 108. This timer is configured to expire after a preconfigured period of time (e.g., 60 seconds, 90 seconds, etc.) and, if a response is not received before the timeout of the timer at the login authority server 106 will inform the request initiator 104 that the login has been declined. If, for example, a login confirmation message is received at the login authority server 106 after the expiration of one of the timers, then the login authority message does not send a message to the request initiator 104 to inform the request initiator that the login has been authorized; instead, the message received after the expiration of the timer will be ignored.

In some embodiments, a second timer may also be initiated at the request initiator 104 so that the request initiator 104 may, itself, track the amount of time that has elapsed after it sent the acknowledgement request to the login authority server 106. The request initiator 104 may be configured to determine that a login has been denied if a response from the login authority server 106 is not received before the expiration of the timer.

The network 120 may include one or more public networks (such as the Internet) and/or one or more private networks (such as a private wired or wireless network).

In at least some embodiments, the request initiator 104 is a web server which may serve a website, for example. The request initiator 104 may be a third party website in that it is not operated by the entity operating the login authority server 106. In some such embodiments, a client device 102 may access the web server via the network 120. The client device 102 may, for example, be a computer including a desktop, notebook, tablet computer, smartphone, connected appliance terminal or device (including, for example, a wearable device such as a smart watch or a wearable computer with an optical head-mounted display). The client device 102 may take other forms apart from those specifically recited herein.

The client device 102 may, for example, include a web browser application installed thereon. In at least some embodiments, the client device 102 may access to the request initiator 104 using the web browser.

The login authority server 106 is also connected to the network 120 and this network connection allows for communications with the request initiator 104 and the user device 108. As noted above, in at least some embodiments, the network 120 may include the Internet and, in at least some such embodiments, the login authority server 106 is a web server.

While a single request initiator 104 is illustrated as being connected to the login authority server 106 in FIG. 1, in practice, the login authority server 106 may connect with and facilitate logins for a plurality of request initiators.

The user device 108 may be any one of a number of different types of devices including, for example, a computer including a desktop, notebook, tablet computer, smartphone, connected appliance terminal or device (including, for example, a wearable device such as a smart watch or a wearable computer with an optical head-mounted display). The user device 108 may take other forms apart from those specifically recited herein.

While a single user device 108 is illustrated in FIG. 1, in practice the login authority server 106 will connect to numerous user devices 108, at least some of which are associated with different users.

Login Authority Server

Figure 2:
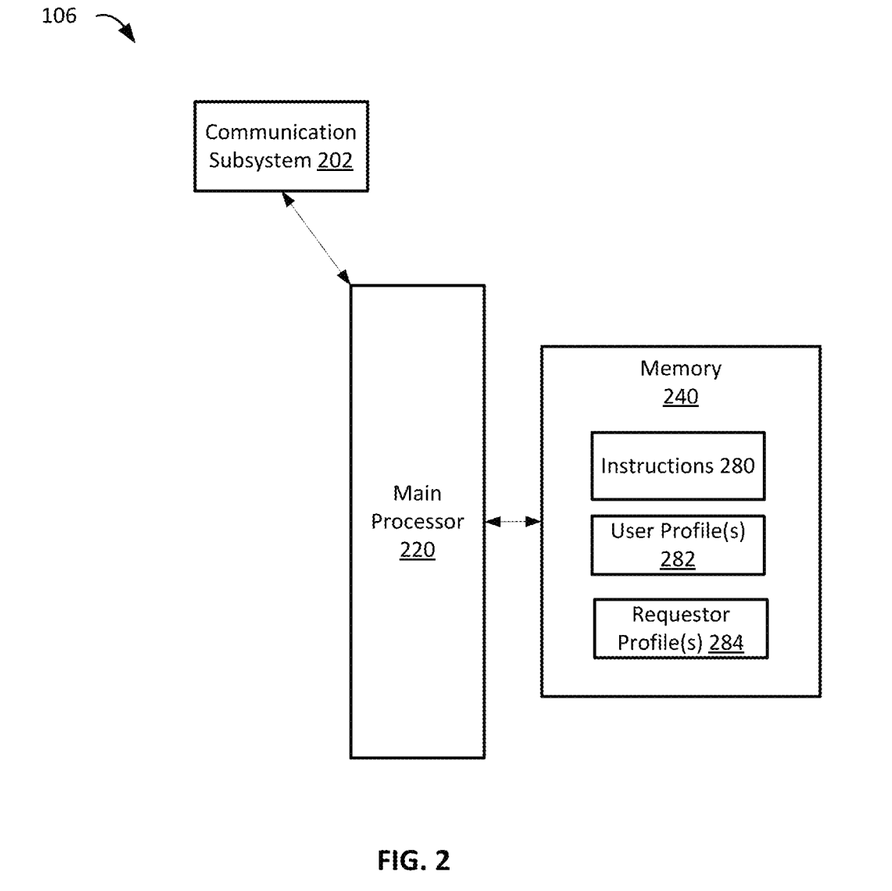
FIG. 2 is block diagram of a login authority server in accordance with an example embodiment of the present disclosure.

Referring now to FIG. 2, an example login authority server 106 is illustrated in block diagram form.

The login authority server 106 includes a controller which controls overall operation of the login authority server 106. In the example, this controller is provided by a main processor 220. The main processor 220 connects to various device subsystems such as, for example, a communication subsystem 202, a power source (not shown), and at least one memory 240. It will be appreciated that the login authority server 106 will include other components that are not specifically illustrated.

The communication subsystem(s) 202 are used for connecting the login authority server 106 to other systems, servers and/or devices, such as the request initiator 104 and the user device 108. More particularly, the communication subsystem(s) 202 allow the login authority server 106 to send to and receive data from the request initiator 104. Similarly, the communication subsystem(s) 202 allows the login authority server 106 to send to and receive data from the user device 108.

The processor 220 is associated with at least one memory 240. The memory 240 may store data and processor-executable instructions 280 which, when executed by the processor, configure the processor 220 to facilitate the login of a user without a password. For example, the processor-executable instructions may, in at least some embodiments, configure the processor 220 to perform the method 800 of FIG. 8 (or a variation thereof).

At least one of the memory components coupled with the processor 220 also stores user profiles 282 for a plurality of users. The user profiles 282 may, in at least some embodiments, be stored in a database. Each user profile may be associated with a unique user or a unique login profile for a user. The user profile includes a user identifier which is unique to that user profile. That is, no two user profiles contain identical user identifiers. A user identifier is assigned to a user during a registration process. This assignment may be random or may be based on user input or selection (e.g., a user may input a user identifier and may be permitted to use that identifier if it is not already assigned to another user).

In addition to a user identifier, a user profile may also include identifying information such as a unique user-name, an alias to be displayed at user device 108, user device 108 association info, identifying statistics such as gender, birthdate, etc., which may be used for security identification purposes, security questions and security answers (these may be used, for example, for making major account/profile changes), valid e-mail address, and other possible identifiers for use in enhancing security and/or the overall user experience. Additionally, this information may be used to assist in serving appropriate ad content within the application of user device 108.

The user profile 282 may also include device identifying information that identifies a device and/or that provides other information regarding a device registered for use by a user. Such information may be referred to as user device 108 information. User device 108 information includes encryption keys, device names, unique identifying device information used in securely locking software applications to devices, and to prevent spoofing of a user device 108, and/or other information. These identifying methods may be unique to each type of user device 108. SSL certificate information may also be stored in memory 240. Additionally, media access control (MAC) addresses, Internet Protocol (IP) addresses, and other less secure identifiers may be captured as needed to report suspicious activity and potential hacker attacks.

The user profile 282 may also include encryption information that is specific to a user or device. For example, one or more keys associated with an encryption or decryption algorithm used for encrypting and/or decrypting communications with the user device 108 may be stored in the user profile or in association with the user profile 282.

Thus, the user profile 282 associates a user identifier with one or more user devices 108. As will be described in greater detail below, this relationship may be used to identify a device which will be provided with an acknowledgment request when a request to authenticate a login is received from a request initiator 104. More specifically, a device associated with the user identifier (e.g., in the user profile 282) that was included in the request to authenticate the login is provided with the authentication acknowledgment message.

The memory may also store one or more requestor profiles 284. A requestor profile is a profile associated with a specific request initiator 104. That is, different request initiators 104 may have different requestor profiles 284. For example, a first requestor profile may be associated with a first request initiator (e.g., a first website) and a second requestor profile may be associated with a second request initiator (e.g., a second website).

The requestor profile 284 may, for example, include a requestor identifier which uniquely identifies a request initiator. The requestor identifier may, for example, be a number or a string comprised of numbers, letters, and/or symbols which uniquely identifies a request initiator. It will be appreciated that other types of requestor identifiers may be used apart from those recited herein.

The requestor profile 284 may also include encryption information that is specific to a request initiator. For example, one or more keys associated with an encryption or decryption algorithm used for encrypting and/or decrypting communications with the request initiator may be stored in the requestor profile 284 or in association with the requestor profile 284.

Requestor profiles 284 can include a unique identifier, a separate authorization identifier, a unique encryption key, a preferred naming convention to be displayed for users, an IP and/or web-site address, a valid e-mail address, and/or request initiator 104 administrator contact information.

While a single memory is illustrated in FIG. 2, in practice, the login authority server 106 will include a plurality of memory components of various types. Each type of memory may be suited for particular uses. By way of example, the login authority server 106 may include a hard disk drive (HDD), a solid state drive (SSD), a flash memory, random access memory (RAM), and/or memory of another type.

User Device

As noted above, in at least some embodiments, a user device 108 may be used to facilitate a password-free login. An example of one such user device 108 will now be discussed with reference to FIG. 3. The user device 108 is illustrated in block diagram form.

Figure 3:
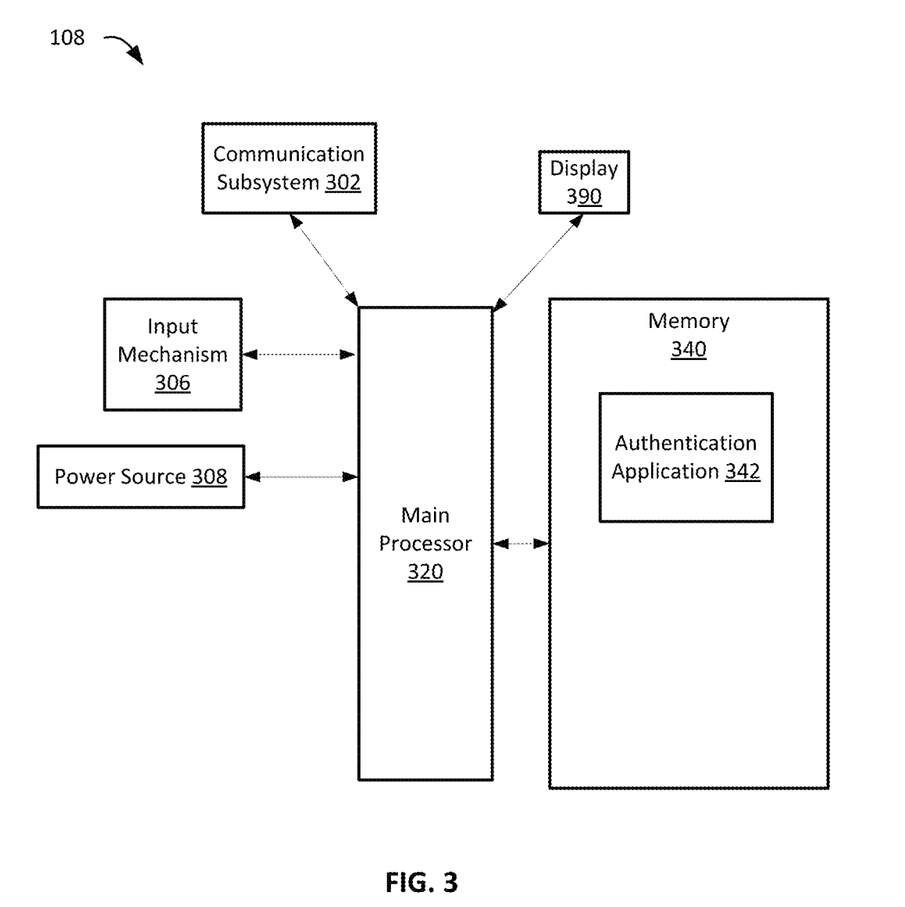
FIG. 3 is a block diagram of a user device in accordance with example embodiments of the present disclosure.

The user device includes a controller which controls overall operation of the user device. In the example, this controller is provided by a main processor 320. The main processor 320 connects to various device subsystems such as, for example, one or more communication subsystems 302, a display 390 (and/or an output device of another type), an input mechanism 306, a power source 308, and/or a memory 340. It will be appreciated that the user device 108 will include other components that are not specifically illustrated.

The communication subsystem 302 is used for connecting the user device to the login authority server 106. Once connected, the user device 108 may send data to and receive data from the login authority server 106. More particularly, the communication subsystem 302 provides for communications between the main processor 320 of the user device and the main processor of the login authority server 106. The user device 108 may, for example, receive, from the login authority server, an acknowledgment request.

The display 390 is an output interface which is used for outputting information from the user device. By way of example, in some embodiments, display screens may be generated on the display 390 based on data received from the login authority server 106. More particularly, in at least some embodiments, the user device 108 is configured to generate a prompt on the display (and/or on another output device, such as a speaker or vibratory mechanism) to request input to authenticate a login. This prompt is generated in response to receiving an acknowledgment request from the login authority server 106. After the prompt, input may be received from an input mechanism associated with the user device. The input may either confirm a desire to proceed with a login (i.e., it may approve the login) or it may indicate a desire to not proceed with the login (i.e., it may disapprove the login). Optionally, the input may request further information in order to authenticate a specific web browser instance request.

The input mechanism 306 is an input interface which allows a user to input instructions to the user device 108. The input mechanism 306 may take a variety of forms including input buttons, a touchscreen display, or a verbal command (through use of an internal/external microphone).

The power source 308 provides power to at least some of the electrical components of the user device 108. By way of example, in some embodiments, the power source may be a battery.

The processor 320 is associated with one or more memory 340. The memory 340 may store data and processor-executable instructions which, in the embodiment illustrated, are provided in the form of an authentication application 342. The memory 340 may also store an operating system (not shown) which is executed by the processor to control the overall operation of the user device 108.

The authentication application 342 is an application that is configured to facilitate a login to a third party system (e.g., the request initiator 104). For example, the authentication application 342 may include processor-executable instructions that configure the processor 320 to perform the method 900 of FIG. 9 or a variation thereof.

While a single memory is illustrated in FIG. 3, in practice, the user device 108 will include a plurality of memory components of various types. Each type of memory may be suited for particular uses. By way of example, the user device 108 may include a hard disk drive (HDD), a solid state drive (SSD), a flash memory, random access memory (RAM), and/or memory of another type.

In some embodiments, key information, such as keys, device identifiers and/or other important information used in the authentication processes described herein, is stored in a highly secure, encrypted state within memory 340 of user device 108. The keys used for encryption are gathered using key information discovered within the user device 108 operating environment. Doing so ensures that the application cannot be cloned to another device, thus protecting users from spoofed applications.

Method of Authenticating Without a Password (Request Initiator Operations)

The request initiator 104 will have components that are similar to those illustrated in FIG. 2 for the login authority server. Namely, the request initiator includes at least one communication subsystem, at least one memory and a processor coupled with the communication subsystem(s) and memory.

Figure 4:
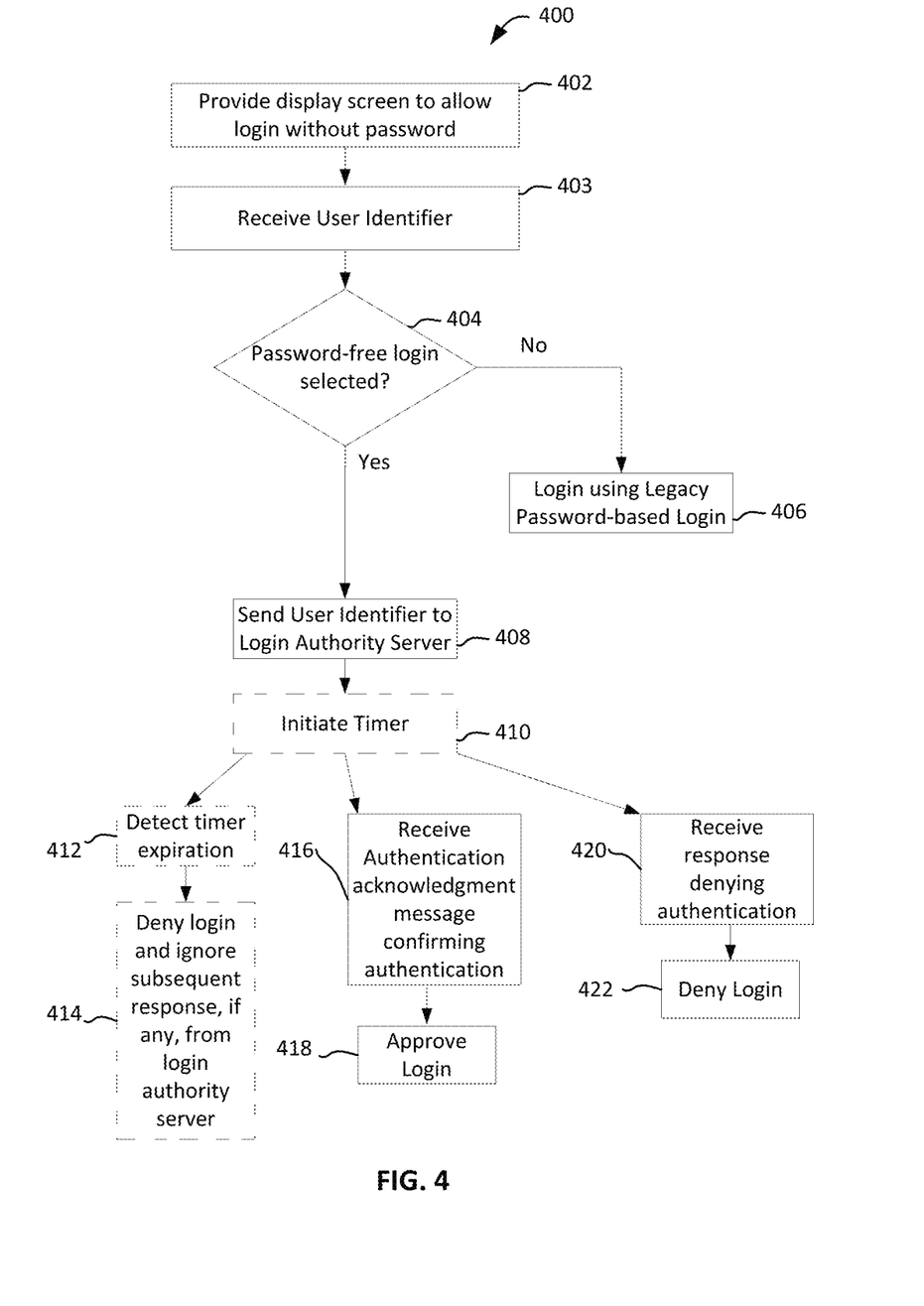
FIG. 4 is an example method for authenticating a login without a password in accordance with example embodiments of the present disclosure.

Referring now to FIG. 4, a method for authenticating a user without a password is illustrated in flowchart form. In at least some embodiments, one or more of the processors associated with the request initiator 104 may be configured to perform the method 400. More particularly, a memory associated with the processor may store processor-executable instructions which, when executed, configure the processor to perform the method 400 of FIG. 4.

At operation 402, a display screen is provided by the request initiator 104. More particularly, a display screen may be generated by the request initiator 104 and provided to a client device 102, where it is displayed. The display screen may be generated in the form of a hypertext markup language (HTML) page and sent to the client device 102.

Figure 5:
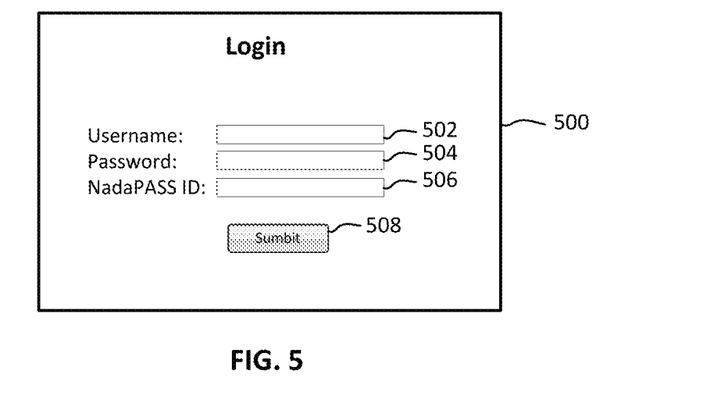
FIG. 5 is an example display screen allowing authentication of a user without a password.
Figure 6:
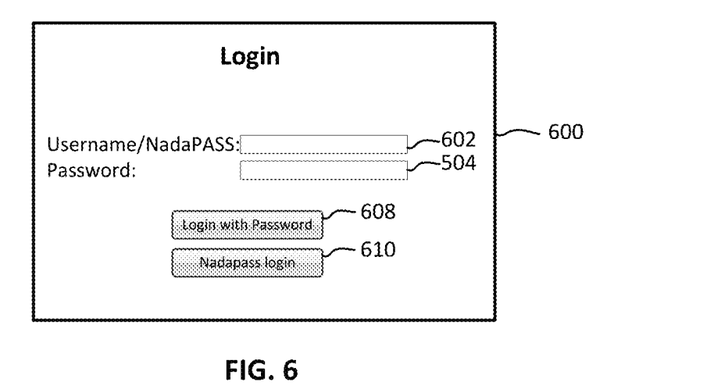
FIG. 6 is another example display screen allowing authentication of a user without a password.
Figure 7:
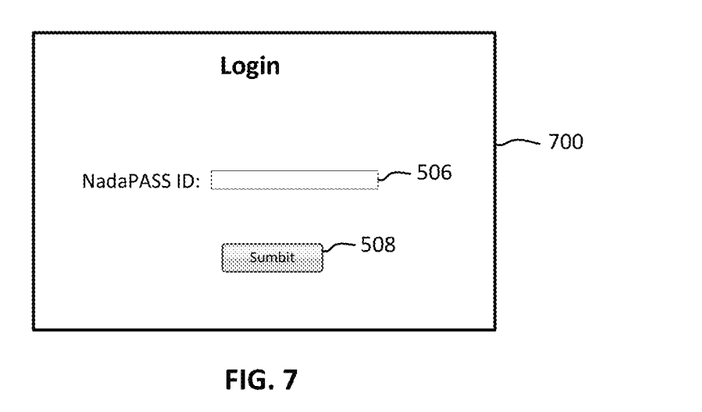
FIG. 7 is another example display screen allowing authentication of a user without a password.

The display screen allows for a login without a password. Reference will now be made to FIGS. 5 to 7, which illustrate example display screens 500, 600, 700. Referring first to FIG. 5, an example of a display screen 500 is illustrated which allows a user (of the client device 102) to select either a password-free login or a legacy password-based login.

In the example of FIG. 5, the traditional username field 502 and password field 504 are provided, which may be used to allow for a legacy password-based login. That is, the username field 502 and the password field 504 may be populated and a submit button 508 used to cause a login to occur according to the traditional password-based manner. However, the display screen 500 also includes a third field, which is a password-free user identifier field 506 (labelled nadaPASS™ in the illustration). This field may be populated to cause a login to occur according to the password-free techniques described herein. More particularly, the password-free user identifier field 506 may be populated with a user identifier pre-registered with the login authority server 106 and the submit button 508 may be activated to initiate the password free login.

In some embodiments, a given user identifier can be associated with multiple user accounts within a single request initiator 104. In such situations, the display screen may allow a user-name to be specified in addition to the password-free user identifier, to select specific accounts (for example, one user may wish to login as himself for personal use, or as another person for professional use) and a single user identifier may be used to do so Referring now to FIG. 6, a further example display screen 600 is illustrated. This example display screen also permits a user to select either a legacy password-based login or a password-free login. However, in this example, a common username field 602 is used to receive either the username associated with the password or the username used for a password-free login. A password field 504 is also provided which is populated only when a user wishes to login with a password; for password-free login, it remains empty. In this example, two submit buttons 608 and 610 are provided. A first submit button 608 is used to indicate an intention to login with a password and a second submit button 610 is used to indicate an intention to login without a password.

In other embodiments (not shown), the display screen may be similar to the display screen 600 of FIG. 6 (e.g., with a shared username field for password-based and password free login) and there may be a single submit button (which is used for both password-based and password free login). In such embodiments, the request initiator 104 may determine whether a password-based login is desired or whether a password-free login is desired by examining the password field; if the password field is empty, then it may determine that a password-free login is desired.

In some embodiments, the display screen may allow for password-free login but not legacy password-based login. One such example is illustrated in FIG. 7. In this example, the display screen 700 does not include a password field. A password-free user identifier field 506 and a submit button 508 are both provided on the display screen 700.

The display screens 500, 600, 700 of FIGS. 5 to 7 may, in some embodiments, be modified to list a browser instance identifier. In such embodiments, the request initiator 104 (or the login authority server 106) may automatically generate the browser instance identifier using a random or near random process. The browser instance identifier may, for example, be a number of predetermined length (e.g. four digits). As will be discussed in greater detail below, in some embodiments, the browser instance identifier may be used to provide an additional layer of security. This additional layer of security may, for example, only be used when a possible attack is detected. For example, in some embodiments, when a possible attack is detected (e.g., when there are too many login attempts using a given user identifier in a short period of time), then a user may be required to input the browser instance identifier that was displayed on the display screen as part of the authentication process. For example, the user may be required to input the browser instance identifier at the user device 108. The login authority server 106 may compare the displayed browser instance identifier (i.e. the browser instance identifier that was displayed on the client device's display screen) to the browser instance identifier that was input at the user device. If there is a match, then the login proceeds. If there is no match, then the login is denied.

Referring again to FIG. 4, after the request initiator has provided the display screen 500, 600, 700, at operation 403 a user identifier may be received. More particularly, the client device 102 may receive a user identifier via a password-free user identifier field 506 or a common username field 602 and may receive a selection of a submit button which causes the client device 102 to send the user identifier to the request initiator 104. In at least some embodiments, the user identifier is sent from the client device 102 to the request initiator using a hypertext transfer protocol (HTTP) post. The user identifier is then received at operation 403.

Notably, when a password-free login is used, a password is not transmitted from the client device 102; only a user identifier is transmitted. By not transmitting a password, sniffing attacks may be foiled.

As noted above, in some embodiments, the display screen 500, 600 may allow both password-free and legacy password-based login to be selected. In some such embodiments, at operation 404, the request identifier determines if password-free login has been selected.

In at least some embodiments, such as embodiments using a display screen 500 of the type described with reference to FIG. 5, during operation 404 the request identifier may determine whether the password-free user identifier field 506 is populated or whether it has been left blank. In such embodiments, if this field is populated, then the request initiator may determine that password-free login has been selected.

In some embodiments, such as embodiments using a display screen 600 of the type described with reference to FIG. 6, during operation 404 the request identifier may determine whether the submit button 610 associated with a password-free login has been activated. In such embodiments, if this submit button 610 has been activated, then the request initiator may determine that password-free login has been selected.

In other embodiments, during operation 404 the request identifier may determine whether a password has been input into a password field 504. In such embodiments, if a password has not been inputted, then the request initiator may determine that password-free login has been selected. If a password has been inputted, then the request initiator may determine that legacy password-based login has been selected.

If password-free login was not selected (i.e., if password-based login is selected), then at operation 406 a login is performed using legacy password-based login techniques.

If, however, the request initiator determines that a password-free login has been selected, then the user identifier is sent to the login authority server 106 at operation 408. More particularly, at operation 408 the request initiator sends a request to authenticate the login to the login authority server 106. In at least some embodiments, the request initiator 104 sends this request using an application programming interface (API) associated with the login authority server 106. For example, the request initiator may perform an API call at operation 408.

In embodiments in which the display screen 700 does not allow a legacy password-based login to be selected, then the method 400 may proceed directly from operation 403 to 408 (i.e., operation 404 and 406 may not be performed).

Prior to sending the user identifier from the request initiator 104 to the login authority server 106, the user identifier may be encrypted by the request initiator 104. This would typically involve the use of heavily secure encryption algorithms (e.g., 256-bit AES encryption or similar methods) using a protected (private) key known by the request initiator 104 and the authority server 106, that is never transmitted during the session.

The user identifier may be sent to the login authority server 106 over a secure sockets layer (SSL) connection (typically 256-bit encryption) to provide additional security.

Notably, no password is transmitted from the request initiator 104 to the login authority server 106. As a result, a password cannot be surreptitiously intercepted during operation 408.

In at least some embodiments, the request initiator 104 may also, at operation 408, send a requestor identifier to the login authority server 106. The requestor identifier uniquely identifies the request initiator 104. That is, it distinguishes the request initiator from other systems that are registered with the login authority server 106.

The requestor identifier may be assigned to the request initiator 104 when the request initiator first registers with the login authority server 106. For example, the requestor identifier may be assigned to the request initiator on a random or chronological basis.

In some embodiments, the request initiator 104 may also, at operation 408, send a browser instance identifier to the login authority server 106.

Optionally, in some embodiments, the request initiator 104 may track the amount of time that has elapsed after the user identifier has been sent at operation 408. For example, at operation 410, the request initiator may initiate a timer (or timers).

If the timer (or timers) expires at operation 412 before a response to the message sent at operation 408 is received, then at operation 414 the request initiator 104 may deny the login. If a subsequent response is received after the timer has expired from the login authority server 106, it may be ignored. For example, if an authentication acknowledgment message is received confirming a user's desire to login, but the timer has already expired, then a login is not performed based on the message.

In some instances, an authentication acknowledgment message confirming a user's desire to login is received at operation 416 prior to the expiration of the timer(s) (or, if there is no timer, then it may be received after the user identifier is sent at operation 408). In response to receiving such a message, at operation 418, the request initiator 104 approves the login. At this point, the request initiator may provide the client device 102 with access to a private, secure and/or user-specific portion of its system. For example, in some embodiments, after logging in, user-data (e.g., e-mails, pictures, or other content that the user has access rights to) may be accessible by the client device 102.

In other cases, the response received from the login authority server 106 may not approve the login request. Instead, at operation 420, a response may be received indicating a desire to not proceed with the login. That is, the response may deny the login. In response to receiving such a message, the request initiator 104 may deny the login at operation 422. In some such embodiments, a display screen may be provided to the client device 102 to indicate that the login was not successful.

Method for Authenticating Login without a Password (Login Authority Server Operations)

Having described example operations that may be performed by the request initiator 104, a discussion of example operations of a login authority server 106 will now be described. As noted above, the login authority server may interact with the request initiator to facilitate a login.

Figure 8:
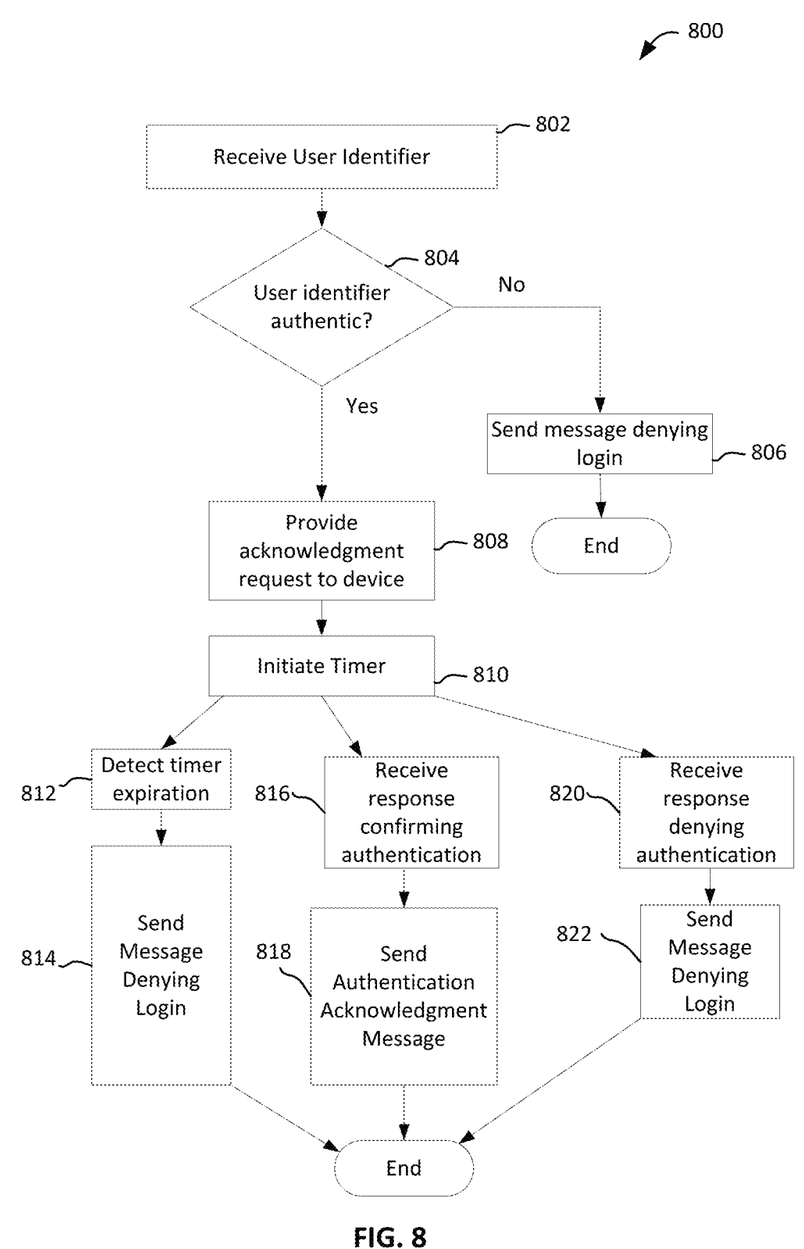
FIG. 8 is an example method for authenticating a login without a password in accordance with example embodiments of the present disclosure.

Referring now to FIG. 8, a method for authenticating a user without a password is illustrated in flowchart form. In at least some embodiments, one or more processors associated with the login authority server 106 may be configured to perform the method 800. More particularly, a memory associated with the processor may store processor-executable instructions which, when executed, configure the processor to perform the method 800 of FIG. 8.

At operation 802, data sent at operation 408 of the method 400 of FIG. 4 is received at the login authority server 106. More particularly, at operation 802 a request to authenticate a login is received from a request initiator 104 which, for example, may be a third party website. The request received at operation 802 includes a user identifier, which may be a username that was input by a user wishing to gain access to the request initiator's system. As noted above, the user identifier uniquely identifies a user in the login authority server 106.

Optionally, a secondary identifier is also passed to the login authority server and received at operation 802. This secondary identifier may be used for further identification. In some embodiments, the secondary identifier may consist of a randomly generated browser instance identifier that ties a user's browser to the overall authentication request.

In at least some embodiments, the message received at operation 802 may also include a requestor identifier which uniquely identifies the request initiator 104. The requestor identifier may, for example, be a number or a string comprised of numbers, letters, and/or symbols which uniquely identifies a request initiator.

The user identifier and/or the requestor identifier may be received as parameters in an API call to the login authority server 106. More particularly, the login authority server 106 may include an API which is accessed by request initiators 104 to submit requests to authenticate logins.

Notably, a password is not received at the login authority server 106 from the request initiator 104. That is, no password is sent from the request initiator 104 to the login authority server 106.

As noted in the discussion of FIG. 4 above, an SSL connection may be used to secure the data transmitted between the request initiator 104 and the login authority server 106. Accordingly, the data received at operation 802 may be received over an SSL connection.

In some embodiments, the data received at operation 802 may be encrypted data (e.g., this encryption may be in addition to the encryption provided by SSL). In such embodiments, the data may be decrypted during the method 800 of FIG. 8. In at least some embodiments, the data may be encrypted using a key that is associated with a specific request initiator 104. In some such embodiments, the data may be decrypted at the login authority server 106 using a key that is specifically associated with the request initiator 104 that sent the data received at operation 802. For example, a decryption key may be retrieved based on the identity of the request initiator 104 that sent the data received at operation 802. The identity of the request initiator may be determined based on the requestor identifier included in the message received at operation 802. For example, one or more keys associated with a decryption algorithm used for decrypting communications with the request initiator may be stored in the requestor profile 284 or in association with the requestor profile 284. The login authority server 106 may use the requestor identifier to identify the appropriate requestor profile 284 and thus the associated decryption key.

At operation 804, the login authority server 106 may authenticate or verify the data received at operation 802. For example, in some embodiments, the user identifier received at operation 802 may be authenticated by determining whether the user identifier has been pre-registered for use with the login authority server 106. That is, the login authority server 106 determines whether a user profile has been configured with the received user identifier (i.e., whether the user identifier exists in the login authority server's memory that stores pre-registered user identifiers).

If the user identifier has been pre-registered, then the login authority server 106 determines that the user identifier is authentic (i.e., it is successfully verified). If the user identifier has not been pre-registered, then the login authority server 106 determines that the user identifier is not authentic (i.e., the verification is unsuccessful).

If the user identifier is not authentic, then at operation 806 a message may be sent to the request initiator 104 to deny the login. The message may notify the request initiator 104 that the user identifier was incorrect so that the request initiator may notify the user (e.g., via the client device 102) to allow the user to re-input the user identifier (e.g., in case it was input incorrectly).

If, however, the user identifier is authentic then the method 800 may proceed to operation 808, which will be discussed in greater detail below, or it may proceed to check the requestor identifier, which will now be discussed.

In some embodiments in which the request to authenticate a login received at operation 802 includes a requestor identifier, the requestor identifier may also be authenticated. More specifically, at operation 804, the requestor identifier may be authenticated by determining whether the requestor identifier has been pre-registered for use with the login authority server 106. That is, the login authority server 106 determines whether a requestor profile 284 has been configured with the received requestor identifier (i.e., whether the requestor identifier exists in the login authority server's memory that stores pre-registered requestor identifiers).

If the requestor identifier has been pre-registered, then the login authority server 106 determines that the requestor identifier is authentic (i.e., it is successfully verified). If the requestor identifier has not been pre-registered, then the login authority server 106 determines that the requestor identifier is not authentic (i.e., the verification is unsuccessful and the requestor identifier is determined to not be authentic).

If the requestor identifier is not authentic, then a message may be sent to the request initiator 104 to deny the login. The message may notify the request initiator that the request identifier was not a valid request identifier.

At operation 808, the login authority server 106 provides, to a device 108 pre-registered for use in association with the user identifier received at operation 802, an acknowledgment request.

More particularly, at operation 808 the login authority server 106 may identify a device 108 associated with a user profile 282 corresponding to the user identifier received from the request initiator 104 (i.e., the user identifier received at operation 802). That is, a user device 108 associated with the user identifier is identified and the acknowledgment request is provided to the identified device.

In some embodiments, the user profile 282 may associate a single user identifier with multiple user devices 108. For example, the user identifier may be associated with both a tablet device and a smartphone. In at least some such embodiments, the login authority server 106 may identify these devices at operation 808 and may send the acknowledgment request to a plurality of user devices associated with the user identifier, or a user device 108 may request any active acknowledgement requests from the authority server 106. For example, in some embodiments, the acknowledgment request is sent to all user devices associated with the user identifier, while in other embodiments, the request will reside at the login authority server 106, until pulled from a user device 108.

In some embodiments, the acknowledgment request is pushed to the identified user device(s) 108 at operation 808. That is, the acknowledgment request is sent to the identified user device(s) without the identified user device(s) requesting the acknowledgment request.

In other embodiments, the acknowledgment request is provided to the user device(s) 108 using a pull technique. More specifically, prior to sending the acknowledgment request, a request is received at the login authority server 106 from the device 108 to provide any pending acknowledgment requests for which the device is authorized to receive but has not yet received. That is, the user device 108 essentially asks for any pending acknowledgment requests. The device may do so automatically in some embodiments. For example, the device may periodically poll the login authority server 106 to request any pending acknowledgment requests. In other embodiments, the device may not ask for the acknowledgment request automatically. Instead, the request for pending acknowledgment requests may be performed in response to another trigger condition, such as user input. In response to receiving the request for pending acknowledgment requests from the user device 108, the login authority server 106 provides the acknowledgment request to the device. More specifically, the device is provided with an acknowledgement request that was associated with a user identifier that is associated with the device.

In some embodiments, the pulling technique may cause less traffic leaving the login authority server 106 (as compared with the push scenario). More specifically, if a user profile 282 associates a user identifier with multiple user devices 108 then, in a push scenario, the acknowledgment request may be pushed to all such devices. However, in the pull scenario, the acknowledgment request is only provided to the user device 108 that requested the pending acknowledgment request. Furthermore, by using the pull technique, it will be more difficult for a hacker to trigger a request at the request identifier (e.g., by logging in using the technique described with reference to operation 403 of FIG. 4) and watch traffic immediately leave the login authority server 106 to devices 108. Using the pull technique, the elapsed time between operation 408 and operation 808 may be greater, making it more difficult for a hacker to attack the system.

In some embodiments, the acknowledgment request that is provided to the user device 108 at operation 808 may include information identifying the request initiator 104. This information may be determined based on the requestor identifier (which may be received at operation 802) but, in at least some embodiments, the information is not the requestor identifier itself. The requestor identifier is not sent to the user device 108 for greater security. The requestor identifier may be used to perform a lookup of other information identifying the requestor. That is, a requestor profile 284 may be identified using the requestor identifier and other identifying information that is associated with the requestor identifier in the requestor profile 284 may be retrieved based on the requestor identifier. For example, this information may be a text-based description of the requestor. By way of example, a name associated with the request initiator 104 may be identified and sent (e.g., the name of a website). In such embodiments, the user device 108 may be configured to use this information to identify the request initiator 104 in a prompt that is generated on the user device 108 in response to the acknowledgment request. Doing so allows a user to know the source of the request so that they may make an informed decision as to whether to confirm or deny the login.

In at least some embodiments, the user identifier is not sent to the user device 108 from the login authority server 106. Since the identifying data (e.g, the user identifier and the requestor identifier) that is sent from the request initiator 104 to the login authority server 106 is not sent from the login authority server 106 to the user device 108, it will be more difficult for a hacker monitoring traffic at the login authority server 106 to relate messages sent to the login authority server 106 to messages sent to the user device 108.

The acknowledgment request that is sent at operation 808 may be sent over an SSL connection, in at least some embodiments. The acknowledgment request may be additionally encrypted using a key, which may be a common code known to both the user device 108 and the login authority server 106. This key may be specific to the user device 108 and/or the user identifier. For example, this would typically involve the use of heavily secure encryption algorithms (e.g. 256-bit AES encryption or similar methods) using a protected (private) key known by the user device 108 and the authority server 106, that is never transmitted during the session. That is, the login authority server's memory may associate a key with a specific user identifier such that different user identifiers may be associated with different keys. In some embodiments, the login authority server's 106 memory may associate a key with a specific user device 108 such that different user devices may be associated with different keys. In addition, in some embodiments, key information, such as keys, device identifiers and other important information, is stored in a highly secure, encrypted state within memory 340 of user device 108. The keys used for encryption are gathered using key information discovered within the user device 108 operating environment. Doing so ensures that the application cannot be cloned to another device, thus protecting users from spoofed applications.

At operation 810, the login authority server 106 initiates a timer(s). The timer(s) is used to track the amount of time that the user device 108 has had access to the acknowledge request. Accordingly, in at least some embodiments, the timer(s) may be initiated immediately before or after the acknowledgment request is provided to the device. In some embodiments, the timer(s) is initiated within a specific amount of time from the time at which the acknowledgment request is provided to the user device.

After the timer is initiated, a number of different events may occur. As noted at other portions of this document, the user device 108 may be configured to generate a prompt in response to receiving the acknowledgment request and to request input to authenticate the login. Based on the input, the device 108 will respond to the acknowledgment request. Thus, after providing the acknowledgment request, the login authority server 106 monitors for a response from the user device 108.

In some cases, the timer may expire before a response to the acknowledgment request is received. More particularly, at operation 812 the login authority server 106 detects the expiration of the timer. The timer is configured to expire after a predetermined period of time which is, in some embodiments, in the range of 20 seconds to 2 minutes.

After the timer expires, any response received from the user device 108 to the acknowledgment request may be ignored. That is, it may be treated as a non-response. In some embodiments, when the expiration of the timer occurs, the login authority server 106 may remove a record of the acknowledgment request from its memory.

If the timer expires before a response to the acknowledgment message is received then at operation 814 a message is sent from the login authority server 106 to the request initiator 104 denying the login.

In some instances, a response to the acknowledgment message is received from the user device 108 before the expiration of the timer. Such a situation is illustrated in operation 816. In such an embodiment, at operation 816 the login authority server 106 determines that a login confirmation message has been received from the user device 108 before the expiration of the timer and, at operation 818 an authentication acknowledgment message is provided to the request initiator 104. The message sent at operation 818 is the message that is received by the request initiator 104 at operation 416 of the method 400 of FIG. 4. Thus, this message may be as described above with reference to operation 416. The message received at operation 816 is, in at least some embodiments, encrypted and/or received over an SSL connection. A key of the type described above with reference to operation 808 may be used to decrypt the message. Encrypting data packets outside of SSL ensures that, even if an SSL session is captured and decoded by a hacker, the data within is still protected through encryption by a key that doesn't exist anywhere in the data path.

The message sent at 818 is, in at least some embodiments, encrypted and/or sent over an SSL connection. The encryption may be performed using a key that is specifically associated with the request initiator 104 as described above with reference to operation 802.

In some embodiments, prior to sending the message at operation 818, the response received at 816 may be authenticated. This authentication may confirm the source of the message. That is, it may confirm that the message did, in fact, originate from the user device 108 and not from a hacker. The source of the message may be verified using device identifying information such as, for example, a universally unique identifier (UUID), a Media Access Control (MAC) address, a registry key, or other information that is sufficiently unique that it would be difficult for a hacker to fake. Such information may be provided in the message received at operation 816 and may be compared to device identifying information known to the login authority server 106 (e.g., device identifying information stored in the user profile 282). If the message does not pass this verification test, then the acknowledgment message is not sent at operation 818. Instead, a message may be sent to the request initiator 104 denying the login (this message may be of the type described above with reference to operation 420 of FIG. 4).

In some embodiments, a response may be received at operation 820 before the expiration of the timer. In this operation 820, the response denies the authentication. In response to receiving this message, the login authority server 106 proceeds to send (at 822) the request initiator 104 a message denying the login request. This is the message that may be received at operation 420 of the method 400 of FIG. 4 and, accordingly, the message sent at operation 822 may be as described above with reference to operation 420.

The login authority server 106 may perform additional security related functions apart from those described above with reference to FIG. 8. For example, in some embodiments, the login authority server 106 may send authentication application integrity tests to the user device 108. These tests are used to ensure that the application has not been tampered with. By way of example, the server 106 may send a test to the application to request the application to return a specific portion of its code. For example, the test may ask for the return of a specific line of source code. The login authority server 106 may then compare the response to an expected response and may unregister the device 108 if the response does not match the expected response (i.e., if the test is failed).

In some embodiments, the login authority server 106 may monitor for unusual login activities and may invoke higher-level security measures if unusual login activities are detected. For example, in some embodiments, the login authority server 106 monitors the quantity of authentication requests received for a each user over a predetermined time period. For example, in some embodiments, the login authority server 106 may count the number of requests received for a given user in the last minute (this time threshold can be different in other embodiments). If the count exceeds a predetermined threshold, then higher-level security measures are invoked.

The higher-level security measures may, in some embodiments, require the input of a browser instance identifier into the user device 108. For example, at operation 808 the login authority server 808 may inform the user device 108 that higher-level security measures have been invoked (e.g., a flag may be set to indicate that higher-level security measures are in effect) and the user device may, in response, prompt the user for input of the browser instance identifier that has been displayed on the display screen displayed at the client device. The user device 108 is configured to send the inputted browser instance identifier to the login authority server 106 (e.g., during operation 816 and/or operation 820) where it is authenticated by comparing it to the browser instance identifier that was displayed at the client device (e.g., and that may have been received at operation 802). If the browser instance identifiers do not match, then a message may be sent to the request initiator denying the login. This message may, for example, be of the type described with reference to operation 822.

Method for Authenticating Login without a Password (User Device Operations)

Having described example operations that may be performed by the request initiator 104 and the login authority server 106, a discussion of example operations of a user device 108 will now be described. As noted above, the user device 108 may interact with the login authority server 106 to facilitate a login at the request initiator 104.

Figure 9:
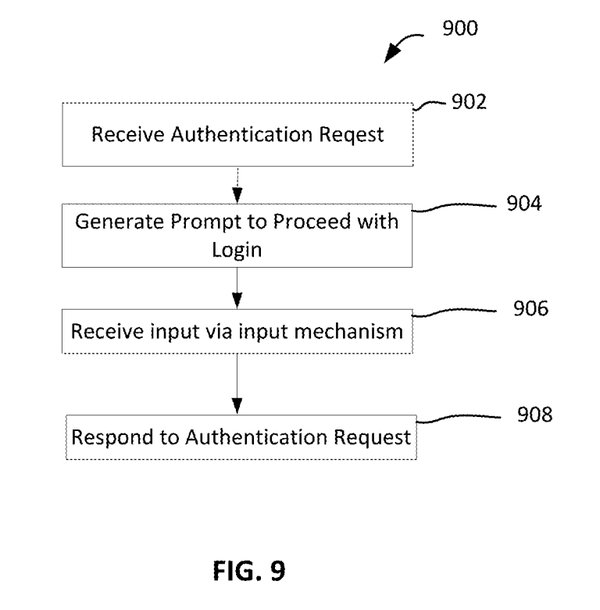
FIG. 9 is an example method for authenticating a login without a password in accordance with example embodiments of the present disclosure.

Referring now to FIG. 9, a method for authenticating a user without a password is illustrated in flowchart form. In at least some embodiments, one or more processors 320 associated with the user device 108 may be configured to perform the method 900. More particularly, a memory 340 associated with the processor may store processor-executable instructions which, when executed, configure the processor to perform the method 900 of FIG. 9. In at least some embodiments, an authentication application 342 may configure the processor 320 to perform the method 900. Accordingly, the method 900 may be performed by a processor 320 of a device 108 pre-registered with the login authority server 106.

At operation 902, an authentication request is received at the user device 108 from the login authority server 106. The authentication request is the message that is sent at operation 808 of the method 800 of FIG. 8 and may be as described above with reference to operation 808. As noted in the discussion of operation 808, this message may be encrypted and so it may be decrypted by the user device 108.

At 904, in response to receiving the authentication request, a prompt is generated requesting user input confirming a desire to proceed with a login. The prompt is, in some embodiments, generated on a display 390 associated with the user device 108 (e.g., a text based message may be displayed notifying the user that an acknowledgment request has been received). The prompt may, in some embodiments, be an audible prompt which may be output over a speaker associated with the device 108 (e.g. an audible message notifying the user that an acknowledgment request has been received).

In some embodiments, the authentication request includes information identifying the request initiator 104 and the prompt is generated based on the information identifying the request initiator 104. For example, a name or other descriptor associated with the request initiator 104 may be displayed to allow the user to make an informed decision as to whether to permit the login or deny the login. By way of example, a message may state: "A request to login to [website name] has been received. Do you wish to allow the login?"

The prompt does not require the input of a password. In at least some embodiments, no password is inputted into the device between the generation of the prompt (at operation 904) and the sending of the response (at operation 908, which is discussed below). More particularly, the prompt requests a simple input to confirm the request. For example, an interface element such as a confirm button may be displayed together with another interface element such as a deny request button. The appropriate button may be selected by a user using an input mechanism 306 at operation 906. More specifically, at operation 906, after generating the prompt, input is received from an input mechanism 306 associated the device 108.

The received input either indicates a desire to proceed with the login (e.g., to approve the login) or indicates a desire to not proceed with the login (e.g., to deny the login).

At operation 908, the user device 108 responds to the authentication request by sending a response to the login authority server 106 based on the received input. For example, if the input received at operation 906 confirms a desire to proceed with the login, then the response sent at operation 908 authorizes the login authority server 106 to inform the request initiator 104 that the login has been authorized. That is, in this scenario the response may be the message that is received at operation 816 of the method 800 of FIG. 8 and may have properties described with reference to operation 816.

If, however, the input received at operation 906 indicates a desire to not proceed with the login, then the response sent at operation 908 informs the login authority server 106 that the login is not authorized. In such a case, the message may be that which is received at operation 820 of the method 800 of FIG. 8 and may have the properties described with reference to operation 820.

While not illustrated in FIG. 9, in some embodiments, the user device 108 may also monitor for stale acknowledgment requests so that such requests may be purged. For example, in some embodiments a timer or timers may be initiated in response to the receipt of the authorization request at operation 902. The timer may track the elapsed time following the generation of the prompt, for example. In some such embodiments, the user device 108 may remove the prompt in response to detecting the expiration of the timer. The timer may, in some embodiments, be configured with the same or a similar time period as the timer used in operation 810 of the method 800 of FIG. 8.

Furthermore, as noted above, in at least some embodiments, the login authority server 106 may be configured to implement higher-level security measures if suspicious activity is detected. In at least some such embodiments, the authentication request received at operation 902 may indicate whether higher-level security measures are in effect (e.g., a flag may be set to indicate this) and the user device 108 may operate differently if higher-level security measures are in effect. For example, in at least some embodiments, the prompt generated at operation 904 may request the user to input a browser instance identifier. This browser instance identifier is received via the input mechanism at operation 906 and is sent to the login authority server 106 at operation 908 where it is authenticated.

The methods 400, 800, 900 and/or portions thereof may be combined into a method that may be performed by a system which includes two or more of the following devices and systems: a user device, a request initiator, and a login authority server. Accordingly, a system that includes two or more of these devices and systems is contemplated. For example, one such system may include the user device and the login authority server. The user device may be configured to perform the operations of the method 900 of FIG. 9 (or portions thereof) and the login authority server may be configured to perform the operations of the method 800 (or portions thereof).

By way of further example, another contemplated system includes the request initiator and the login authority server. The request initiator is configured to perform the operations of the method 400 of FIG. 4 (or portions thereof) and the login authority server is configured to perform the operations of the method 800 of FIG. 8 (or portions thereof).

In yet another example, another contemplated system includes a request initiator, a login authority server and a user device. The request initiator is configured to perform the operations of the method 400 of FIG. 4 (or portions thereof) and the login authority server is configured to perform the operations of the method 800 of FIG. 8 (or portions thereof) and the user device may be configured to perform the operations of the method 900 of FIG. 9 (or portions thereof).

Furthermore, methods for establishing a user profile 282 for a user and/or a requestor profile 284 for a request initiator are also contemplated. In one such embodiment, a user downloads the authentication application 342 to as many phones, tablets, or other devices as he or she likes. When the application is installed on a device, it is automatically registered in the user profile. That is, device identifying information may automatically be stored in the user profile. If the user has already established a user identifier, then the user may input the user identifier during the installation process so that the appropriate user profile 282 may be updated. If the user has not yet obtained a user identifier, the user may select a user identifier. This user identifier may, in some embodiments, include the user's e-mail address.

In some embodiments, techniques may be employed by the login authority server 106 to ensure that the desired user identifier is sufficiently unique to avoid it being accidentally inputted by another user. For example, the login authority server 106 may ensure that the user identifier differs from existing user identifiers by at least a predetermined number of characters (e.g, two or more characters). In some embodiments, an e-mail address may be concatenated with a number of predetermined length to create a user identifier. For example, in some embodiments, the login authority server 106 may recommend the use of an e-mail address plus a four digit number.

In some embodiments, the login authority server 106 may only require the user identifier to be unique and may simply make suggestions to make it more unique. In other embodiments, the login authority server 106 may impose rules regarding the uniqueness of the user identifier.

The various embodiments presented above are merely examples. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A server-implemented method for authenticating a login without a password, the method comprising:
   receiving, at the server and from a request initiator, a request to authenticate a login, the request including a user identifier;
   providing, from the server and to a device pre-registered for use in association with the user identifier, an acknowledgement request, the device being configured to generate a prompt in response to receiving the acknowledgment request, the prompt requesting input to authenticate the login;
   initiating a timer at the server, the timer tracking the amount of time that the device has had access to the acknowledgment request;
   determining, by the server, that a login confirmation message has been received from the pre-registered device before expiration of the timer; and in response to determining that the login confirmation message has been received from the pre-registered device before expiration of the timer, providing, by the server, an authentication acknowledgment message to the request initiator such that the login is authenticated without the use of a password.

2. The method of claim 1, wherein a password is not received from the request initiator.

3. The method of claim 1, wherein providing the acknowledgment request comprises:
  identifying a device associated with a user profile corresponding to the user identifier received from the request initiator; and
  providing the acknowledgment request to the identified device.

4. The method of claim 3, wherein providing the acknowledgment to the identified device comprises:
  pushing the acknowledgment request to the identified device.

5. The method of claim 1, wherein providing the acknowledgment request comprises:
  receiving a request from the device to provide any pending acknowledgment requests for which the device is authorized to receive but has not yet received; and
  in response to receiving the request from the device, providing the acknowledgement request to the device.

6. The method of claim 1, wherein the request to authenticate a login further includes a requestor identifier identifying the request initiator, the method further comprising, prior to providing the acknowledgment request:
  authenticating the requestor identifier by determining that the requestor identifier has been pre-registered for use with the login authority server.

7. The method of claim 1, wherein the request to authenticate a login further includes a requestor identifier identifying the request initiator, the method further comprising:
  based on the requestor identifier, providing information identifying the request initiator to the pre-registered device,
  and wherein the prompt identifies the request initiator.

8. The method of claim 1, wherein the request initiator is a third party website.

9. The method of claim 1, further comprising, prior to providing the acknowledgment request:
  authenticating the user identifier by determining that the user identifier has been pre-registered for use with the login authority server.

10. The method of claim 1, further comprising:
  authenticating the login confirmation message to determine that the login confirmation message was received from the pre-registered device.

11. The method of claim 1, further comprising:
  receiving a browser instance identifier from the request initiator;
  receiving a user-input browser instance identifier from the pre-registered device; and
  comparing the browser instance identifier received from the request initiator to the user-input browser instance identifier,
  and wherein the authentication acknowledgment message is provided based on the comparison.

12. A login authority server comprising:
  one or more communication subsystems for communicating with other devices;
  a processor coupled to the communication subsystem;
  at least one memory coupled to the processor, the memory storing user profiles for a plurality of users, at least one user profile associating a user identifier with an electronic device pre-registered for use with the user associated with the user identifier, the memory storing processor-executable instructions which, when executed by the processor, cause the processor to:
  a) receive, from a request initiator, a request to authenticate a login, the request including one of the user identifiers; b) provide, to the electronic device pre-registered for use in association with the user identifier, an acknowledgement request; c) initiate a timer, the timer tracking the amount of time that the device has had access to the acknowledgment request; d) determine that a login confirmation message has been received from the pre-registered electronic device before expiration of the timer; and e) in response to determining that the login confirmation message has been received from the pre-registered electronic device before expiration of the timer, provide an authentication acknowledgment message to the request initiator such that the login is authenticated without the use of a password.

13. The login authority server of claim 12, wherein a password is not received at the login authority server from the request initiator.

14. The login authority server of claim 13, wherein providing the acknowledgment request comprises:
  identifying a device associated with a user profile corresponding to the user identifier received from the request initiator; and
  providing the acknowledgment request to the identified device.

15. A method for facilitating a login without a password, the method being performed by a processor of a device pre-registered with a login authority server, the login authority server configured for receiving, from a request initiator, a request to authenticate the login, the method comprising:
  receiving an authentication request from the login authority server;
  in response to receiving the authentication request, generating a prompt requesting user input confirming a desire to proceed with a login;
  after generating the prompt, receiving input from an input mechanism associated with the device; and
  responding to the authentication request by sending a response to the login authority server based on the received input, such that the login is authenticated without the use of a password.

16. The method of claim 15, wherein the received input indicates a desire to proceed with the login and wherein the response authorizes the login authority server to inform the request initiator that the login has been authorized.

17. The method of claim 16, wherein the prompt does not require input of a password and no password is input to the device between the generation of the prompt and the sending of the response.

18. The method of claim 15, wherein the authentication request includes information identifying the request initiator and wherein the prompt is generated based on the information identifying the request initiator.

19. The method of claim 15, wherein the received input indicates a desire to not proceed with the login and wherein the response informs the login authority server that the login is not authorized.

20. The method of claim 15, further comprising:
  initiating a timer to track the elapsed time following the generation of the prompt.

* * * * *